United States Patent [19]
Kovacs

[11] 3,711,067
[45] Jan. 16, 1973

[54] EXTRUDING AND MIXING EQUIPMENT

[75] Inventor: Lloyd Kovacs, Somerset, N.J.

[73] Assignee: Midland-Ross Corporation, Cleveland, Ohio

[22] Filed: Jan. 8, 1971

[21] Appl. No.: 105,010

[52] U.S. Cl. .....................259/191, 259/9, 425/207, 425/209
[51] Int. Cl. ..............B29f 3/02, B29f 3/08
[58] Field of Search..18/12 SE, 12 SM, 12 SB, 12 SJ, 18/12 SN, 12 F, 12 SS, 30 SH, 30 SQ; 259/4, 9, 10, 25, 26, 45, 46, 68, 69, 109, 110, 191; 415/72; 416/176, 177; 425/207, 209

[56] References Cited

UNITED STATES PATENTS

| | | | |
|---|---|---|---|
| 309,567 | 12/1884 | Schlickeysen | 18/12 SS UX |
| 2,902,923 | 9/1959 | Stacy | 18/12 SC X |
| 3,535,737 | 10/1970 | Hendry | 18/12 S X |
| 3,130,666 | 4/1964 | Hiller | 18/12 SB UX |
| 1,090,956 | 3/1914 | Zinteck | 416/176 |
| 1,211,390 | 1/1917 | Bennett | 415/72 |
| 3,344,215 | 9/1967 | Witz et al. | 18/12 SE UX |
| 3,286,992 | 11/1966 | Almeniades et al. | 259/4 |

*Primary Examiner*—Robert D. Baldwin
*Assistant Examiner*—Michael O. Sutton
*Attorney*—Woodrow W. Portz and Rivin L. Groh

[57] ABSTRACT

Equipment including material-forwarding and mixing facilities arranged in tandem with respect to the direction of flow of a potentially thermoplastic material to achieve a high degree of homogenization of the heat content and composition of the discharged product. The mixing facility occurs downstream from the material-propulsion facility and is constructed to effect multitudinous channeling in conjunction with working of the material resulting from friction between the material and the inner surface of a barrel surrounding the mixing facility. The mixing facility may be rotated to promote the action by barrel on the material.

10 Claims, 5 Drawing Figures

PATENTED JAN 16 1973 3,711,067

INVENTOR.
LLOYD KOVACS
BY
*M M Portz*
ATTORNEY

EXTRUDING AND MIXING EQUIPMENT

DESCRIPTION

In the preparation of potentially thermoplastic materials for extrusion of certain types of products, e.g., foamed materials and blown films, the successful performance of the entire processing and the quality of the product are greatly dependent on the uniformity of composition and temperature that can be achieved in the material as it issues from an extruding die. Another aspect of preparing materials for passage through an extrusion die is the development of higher temperatures (either intentional or unavoidable) than desirable in the material as it issues from the extruding die. In many instances, this means that drastic reduction of temperature should be achieved, if possible, as it nears and passes through an extrusion die while maintaining a desired level of homogeneity in composition and heat distribution.

In the production of blown films or foamed structures, temperatures of the materials to be extruded are reduced to the lowest practical level because of the necessity for having the product "set up" or achieve a self-supporting or non-plastic condition as soon as possible after leaving the die. In the case of foamed products, there is the problem of achieving homogeneous distribution of the foaming agent throughout the resin or polymer supplying the structure of the foamed product while effecting a reduction of temperature. The viscosity increases and hence the difficulty of mixing increases as the temperature is reduced. In the case of blown film, slight variations in temperature and composition in the material issuing from the die as measured along the die orifice cause variations in film thickness and clarity.

Hence, objects of the invention are to provide:

1. equipment for extruding thermoplastic materials wherein greater homogeneity in heat and composition can be achieved than in simple screw extruders;
2. equipment for achieving substantial changes in temperature while attaining a high degree of homogeneity and uniformity of temperature and composition in the material discharged from the equipment;
3. machinery for handling heat-sensitive materials with greater freedom from temperature damage without sacrificing the uniformity of composition and heat distribution;
4. equipment of which a mixing unit may be readily used and attached to existing extruder equipment without substantial reconstruction;
5. extruding and mixing equipment comprising an independently operable homogenizing unit susceptible of operation at different rates; and
6. extruding and mixing apparatus permitting introduction of a foaming agent into a heat-plasticized material at the discharge end of the heat plasticizing device, usually a screw extruder, such apparatus thereafter effecting a fixed efficient mixing of the foaming agent with the heat-plasticized material and, at the option of the operator, cooling the mixed material before extrusion of the mixed material from the mixing zone.

To achieve the above objects and any others incidental thereto apparatus is provided in which the invention resides in the combination of a device, such as a screw extruder, for forwarding and, in most cases, simultaneously mixing and heat plasticizing a thermoplastic material and mechanism enclosed within a barrel at the discharge end of the propulsion unit comprising a plurality of convoluted, somewhat helical blades connected in end-to-end relationship progressively lengthwise of the axis of the barrel. The adjacent ends of each pair of adjacent blades are angularly spaced from one another to effect multitudinous channeling of the material passing progressively over the blades to effect temperature control, usually a reduction in temperature, to a desired level. The barrel wall comprises or supports or incorporates a cooling or heating facility.

In the drawing with respect to which the invention is described:

Figure 1:
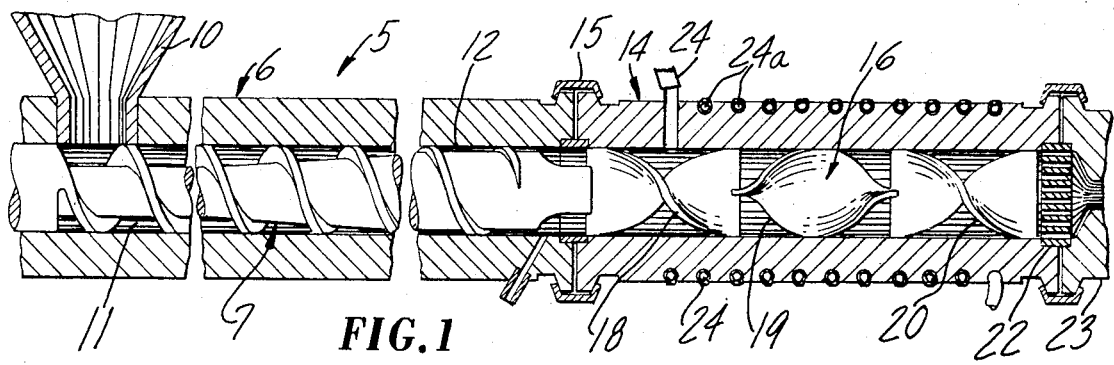
FIG. 1 is a fragmentary longitudinal cross section of apparatus providing a multiple-section barrel having an elongate bore and an extruder screw connected in tandem and fixed relation with a multiple blade mixing member rotatable within the barrel along with the screw member.
Figures 2, 3:
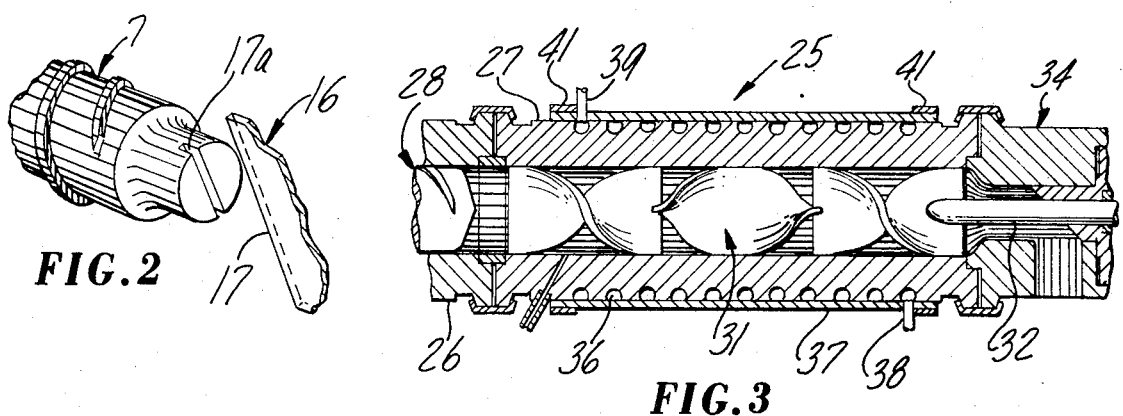
FIG. 2 is a fragmentary perspective exploded view of adjacent normally connected end portions of the screw and mixing member of FIG. 1.
FIG. 3 is a fragmentary view in longitudinal cross section of apparatus having a barrel defining a bore, an extruder screw and a multiple-blade helical member received in the bore in independently driven, relatively rotatable relationship.

According to one embodiment of the invention, as illustrated in FIGS. 1 and 2, an apparatus 5 comprising a barrel section 6 and a screw 7 closely resembles the barrel and screw of a conventional extruder which receives material from a hopper 10 for conducting any suitable potentially thermoplastic resin or composition into the feed section 11 of the present apparatus. In a manner usual with conventional extruders, the screw member 7 has a conventional metering section 12 which controls passage of material through the apparatus at a substantially uniform rate at any selected speed of screw rotation.

Figure 4:
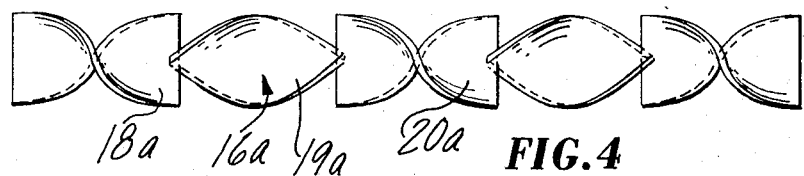
FIG. 4 is a fragmentary view of a multiple blade mixing member of modified design.

The apparatus shown in FIG. 1 includes also a barrel section 14 connected to the barrel section 6 in fixed coaxial relationship as shown with a bore of the same diameter as that of the section 6. Barrel section 14 is connected rigidly to the section 6 normally by conventional clamps 15. Received in the bore of section 14 is the mixing member 16 which comprises a plurality of blades 18, 19 and 20. As shown, the blades are connected in end-to-end relationship with end portions axially overlapping each other and, as shown, the end edges of the blades are angularly spaced 90° apart. The blades are of generally helical or convoluted configuration but as shown in FIG. 1 are not truly helical since each blade has substantially flat end portions which occur in a plane containing the longitudinal axis of the apparatus. The individual elements are typically produced by gripping a flat piece of metal by its ends and twisting it 180°. The axis N–N is also the axis of rotation of members 6 and 16. As an example of a mixing member constituted of truly helical elements, see convoluted member 16a of FIG. 4 wherein elements 18a and 19a and 20a may be considered as cut from a long band of metal twisted to form its outer edges into true helices with resulting articles cut into a number of elements. As, shown, the mixing blades of all embodiments have a width substantially the same dimension as the inner diameter of the surrounding barrel section.

The member 16 with the elements 18, 19, 20 shaped to dispose end portions of each element in an axial plane has the advantage of causing material traversing the elements to pass from one element to the other in a substantially rectilinear direction. This eliminates sudden changes in the direction of passage of material from one element to the other such as incurred with the member 16a and a somewhat lower energy input in forcing material through the mixing assembly (barrel section 14 and member 16) of the apparatus. Mixing action, however, may be somewhat more vigorous within a mixing unit comprising the member 16a.

FIG. 2 illustrates adjacent end portions of the screw member 6 and the mixing member 16 slightly separated but normally joined as shown in FIG. 1 by the end portion 17 being received in the slot 17a of the member 6 during operation. In joining the two members, the flat end portion of element 18 is a distinct advantage in forming the slots 17a to a simple planate configuration. Flat end portions of the elements 18, 19, 20 also simplify the formation of slots in the end portions of the elements which join one element to the next since it simplifies the shape of the slot needed to obtain axial overlap of the elements essential to forming a welded joint of one element with the other.

The apparatus of FIG. 1 is shown with a duct 24 extending radially through a front end portion of the barrel section 6. This duct is useful for introducing a liquid or gaseous foaming agent into the fully plasticized material issuing from the front end of the screw. A plurality of such ducts located at different angular locations along the barrel section may be used to insure better mixing of the foaming agent with material discharged by the screw 7.

As shown, the member 16 is loosely received in the slot 17a and entrapped from endwise movement within the barrel section 14 by a foraminous breaker plate 22, normally a screen support, confined within a recess therefor defined by the adjacent ends of the barrel 14 and a nozzle 23 secured together by another clamp 15. The barrel section 16 has a spiral groove 24 formed to slightly greater than half-circle cross section which receives a tube 24a of copper or other flexible material forced thereinto for conducting a heat exchange fluid, usually a cooling liquid, therethrough.

FIG. 3 discloses a modified embodiment of the invention wherein an extruding and mixing apparatus 25 has barrel sections 26, 27 similar in design to sections 6 and 16, respectively, of FIG. 1. The apparatus further comprises a conventional screw 28 in axially spaced relation with an independently rotatable mixing member 31 comprising a drive shaft 32 connected with an outward source of rotative power (not shown). The shaft 32 is received in bearing relation with a packing gland 33 forming a portion of an angular nozzle support 34.

A variation of mixing effects is possible by driving the member 31 in the same direction as the screw 28 or in the opposite direction. If there is a tendency toward non-uniformity in the material discharged by the screw, the member 31 may be driven in a direction opposite to that of screw movement or it may be driven in the same direction but more fastly or slowly.

The barrel section 27 is provided with a spiral groove 36 enclosed by a sleeve 37 fitting sufficiently closely to the outer surface of the barrel section to cause substantial movement through the groove of a heat exchange fluid from an inlet 38 to an outlet 39. The sleeve 37 is sealed at its ends relative to the barrel section by conventional means, such as clamps 41. Cooling or heating liquids may be circulated through the resulting cooling jacket as required. A foaming agent may be introduced into the zone traversed by the member 31 through a duct 42 through a rear end wall portion of barrel section 27.

Figure 5:
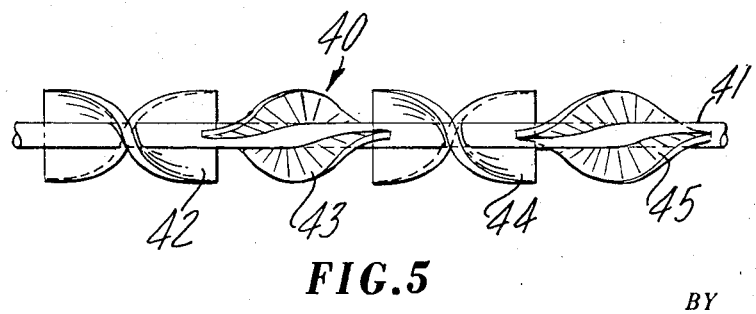
FIG. 5 is a fragmentary view of modified multiple blade mixing member incorporating a central reinforcing shaft.

FIG. 5 illustrates a modified mixing member having structure which may be substituted for members 16 or 31. The mixing member 40 differs essentially from those disclosed above by comprising a reinforcing shaft 41 extending to the member in coaxial relation with its axis of rotation. Construction of the member 40 is somewhat more complicated in that the elements 42, 43, 44, 45 each comprise two ribbon-like halves which must be separately formed and separately secured to the shaft as by welding. The shaft 41 readily enables the member 40 to be driven independently of the screw of the apparatus or to be interconnected with the screw by means readily available to the ordinarily skilled, or not driven at all but permitted to float within its barrel section independently of a driving means. However, in practicing this invention, mixing of the material, avoidance of channeling, avoidance of dead spots, superior heat transfer, and cleanliness of the surface of the barrel is obtained by forcibly rotating the mixing member.

In passing through any one of the mixing members described above, the material is discharged from the screw and is channeled in an extremely complex fashion, as the original stream entering the mixing zone of the apparatus becomes fractionated many times and circulated and rotated by the action of the barrel on the material as a result of rotation of the mixing member and the spiral movement of the material therethrough. Both FIGS. 1 and 3 illustrate ducts through the barrel wall for discharging a foaming agent into a region adjacent to adjacent ends of the screw and the mixing member.

This is an extremely advantageous aspect of the invention in that the foaming agent may be introduced into the plasticized material without producing the normal reduction of the viscosity that is entailed in introducing the foaming agent into the material at a point substantially upstream from the front end of the screw to thus maintain a high delivery rate of the screw. In this manner, temperature and viscosity is maintained in the portion of the apparatus occupied by the screw and the foaming agent is introduced at the end of the screw into the material at a maximum temperature thereof which is advantageous for effective distribution of the foaming agent. The mixing member ensures that the foaming agent will be thoroughly mixed with the material and also provides a region in which the temperature of the material may be reduced to a satisfactory level for forming the product.

What is claimed is:

1. Extruder and mixing apparatus comprising:

a barrel having a first barrel section and a second barrel section connected in end-to-end relationship, the second section having a longitudinal axis in respect to which it is circular and concentric;

means housed in the first section and movable means therewithin for forwarding a fluid plastic material into the second section, mixing means housed within the second section comprising a plurality of convoluted blades connected in end-to-end relationship progressively lengthwise of said axis with the width of the blades having substantially the same dimension as the inner diameter of said second section, and end portions of the blades in axially overlapping relationship;

the adjacent ends of each pair of adjacent blades being angularly spaced from one another about said axis.

2. The apparatus of claim 1 comprising:

means for supporting said mixing means in rotatable relation with said second section with said axis as an axis of rotation.

3. The apparatus of claim 1 wherein:

said first section and movable means define an extruder barrel and screw;

said apparatus comprises means for supporting said mixing means in rotatable relation with said second section with said axis an axis of rotation; and said mixing means is connected in drive relation with said screw.

4. The apparatus of claim 2 comprising:

means independent of said movable means for rotating said mixing means.

5. The apparatus of claim 1 wherein:

the helix angle of at least one blade varies progressively along the length from substantially 90° at one end to a desired minimum angle halfway along the length and then back to substantially 90° at the other end of the blade.

6. Extruding and cooling apparatus comprising:

a first barrel section and a second barrel section connected in end-to-end relationship;

a second section having a longitudinal axis with respect to which it is circular and concentric;

means housed in the first section and movable means therewithin for forwarding a fluid plastic material into the second section;

mixing means housed within the second section comprising a plurality of convoluted blades connected in end-to-end relationship proceeding lengthwise of said axis with the width of the blades having substantially the same dimension as the inner diameter of said second section, and end portions of the blades in axially overlapping relationship;

the adjacent ends of each pair of adjacent blades being angularly spaced with one another about said axis; and means for circulating a coolant in heat exchange relation with said second section.

7. The apparatus of claim 1 wherein:

adjacent blades extend at reversed helical angle.

8. The apparatus of claim 7 wherein:

the outer edges of the blades extend approximately 180 degrees about said axis.

9. The apparatus of claim 1 comprising:

duct means extending through a wall portion of said barrel adjacent the connection of said barrel sections for introducing a fluid into the interior of the barrel.

10. The apparatus of claim 1 wherein:

at least one of said blades has substantially flat end portions occurring in planes containing the longitudinal axis of the apparatus.

* * * * *